(12) United States Patent
Regnard et al.

(10) Patent No.: US 9,447,809 B2
(45) Date of Patent: Sep. 20, 2016

(54) METAL FASTENER

(71) Applicant: LISI AEROSPACE, Paris (FR)

(72) Inventors: Benoit Regnard, Saint Germain de la Grange (FR); Julien Goyer, Saint Gratien (FR); Martial Broucke, Trie Chateau (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 14/954,360

(22) Filed: Nov. 30, 2015

(65) Prior Publication Data

US 2016/0083109 A1 Mar. 24, 2016

Related U.S. Application Data

(63) Continuation of application No. PCT/FR2013/052427, filed on Oct. 10, 2013.

(30) Foreign Application Priority Data

Jul. 19, 2013 (FR) .................... 13 57157

(51) Int. Cl.
*F16B 37/00* (2006.01)
*F16B 33/06* (2006.01)
*B64D 45/02* (2006.01)
(Continued)

(52) U.S. Cl.
CPC ............ *F16B 33/06* (2013.01); *B64D 45/02* (2013.01); *C25D 11/022* (2013.01); *F16B 25/0021* (2013.01); *F16B 33/006* (2013.01)

(58) Field of Classification Search
CPC ...... B64D 45/02; C25D 11/022; F16B 33/06

USPC .................................. 411/424, 914
See application file for complete search history.

(56) References Cited

U.S. PATENT DOCUMENTS 2,518,468 A 8/1950 Harding
2,934,480 A 4/1960 Slomin
(Continued)

FOREIGN PATENT DOCUMENTS

DE 19840298 A1 3/2000
DE 202006008314 U1 8/2007
(Continued)

OTHER PUBLICATIONS

Poll, Andreas, International Search Report for WO/2015/007957, Mar. 13, 2014, 6 pages, ISA European Patent Office.
(Continued)

*Primary Examiner* — Gary Estremsky
(74) *Attorney, Agent, or Firm* — Henricks, Slavin & Holmes LLC

(57) ABSTRACT

The invention relates to a metal fastener that makes it possible to ensure an electrically conductive surface along the entire thickness of structural elements to be assembled. The fastener thereby comprises a head and a smooth shank extending along an axis of revolution, characterized in that the shank comprises at least one conductive portion and one lubricating portion disposed along the axis of revolution of the fastener along at least one length of the shank. The inventive fastener makes it possible to ensure a conductive surface in the entire thickness of the structure in which it is installed.
The inventive fastener is particularly intended for aeronautical applications.

24 Claims, 2 Drawing Sheets

(51) Int. Cl.
 *F16B 33/00* (2006.01)
 *C25D 11/02* (2006.01)
 *F16B 25/00* (2006.01)

(56) References Cited

U.S. PATENT DOCUMENTS

| | | | |
|---|---|---|---|
| 2,998,361 | A | 8/1961 | Kitamura |
| 3,075,896 | A | 1/1963 | Mcgraw et al. |
| 3,400,058 | A | 9/1968 | Chambers et al. |
| 3,407,903 | A | 10/1968 | Sansabrino |
| 3,820,297 | A * | 6/1974 | Hurd .................... F16B 19/1054 403/2 |
| 3,831,213 | A | 8/1974 | Bedi |
| 3,979,351 | A | 9/1976 | Sekhon |
| 3,983,304 | A | 9/1976 | Sekhon |
| 4,702,655 | A * | 10/1987 | Kendall ............... F16B 19/1054 29/523 |
| 5,018,920 | A * | 5/1991 | Speakman ............... B21J 15/02 411/339 |
| 5,922,472 | A * | 7/1999 | Keener .................... B21K 1/58 148/251 |
| 6,228,241 | B1 * | 5/2001 | Alwitt .................... C25D 11/20 205/105 |
| 2002/0051695 | A1 | 5/2002 | Friederich et al. |
| 2003/0086772 | A1 * | 5/2003 | Giannakakos .......... C22C 14/00 411/432 |
| 2004/0131943 | A1 | 7/2004 | Brown |
| 2004/0163740 | A1 | 8/2004 | Keener |
| 2004/0247835 | A1 | 12/2004 | Keener |
| 2005/0181330 | A1 * | 8/2005 | Kim ..................... A61C 8/0069 433/173 |
| 2009/0285654 | A1 * | 11/2009 | Stecher ................... F16B 19/02 411/426 |
| 2010/0001137 | A1 * | 1/2010 | Keener ................. B29C 65/562 244/131 |
| 2010/0124472 | A1 * | 5/2010 | Nguyen ................. B64D 45/02 411/337 |
| 2010/0272537 | A1 * | 10/2010 | Haylock ................. F16B 39/01 411/80.1 |
| 2011/0142567 | A1 * | 6/2011 | Haylock ................ B64D 45/02 411/360 |
| 2012/0155229 | A1 * | 6/2012 | Araki ..................... G04B 5/165 368/285 |
| 2015/0147136 | A1 | 5/2015 | Maurel et al. |

FOREIGN PATENT DOCUMENTS

| | | |
|---|---|---|
| DE | 102010040338 A1 | 3/2012 |
| EP | 2406336 | 9/2010 |
| FR | 1240657 A | 9/1960 |
| FR | 2215453 A1 | 8/1974 |
| FR | 2851580 A1 | 8/2004 |
| FR | 2855836 A1 | 12/2004 |
| FR | 3008754 A1 | 1/2013 |
| FR | 3008754 A1 | 1/2015 |
| FR | 3013781 A1 | 5/2015 |
| GB | 2212580 A | 7/1989 |
| JP | 2009030736 A1 | 2/2009 |
| JP | 2009127777 A | 6/2009 |
| WO | WO 2007/122079 A1 | 11/2007 |
| WO | WO 2010/088647 A1 | 8/2010 |
| WO | WO 2011/050040 A1 | 4/2011 |
| WO | WO 2012/118855 A2 | 9/2012 |
| WO | WO 2015/007919 A1 | 1/2015 |
| WO | WO 2015/007957 A1 | 1/2015 |

OTHER PUBLICATIONS

French Patent Office, French Search Report for French Patent Application No. 1361603 mailed Jul. 16, 2014.
French Patent Office, French Search Report for French Patent Application No. 1361603 mailed Aug. 14, 2015.
File History for U.S. Appl. No. 14/547,802, filed Nov. 19, 2014.
French Application Serial No. 135715, filed Jul. 19, 2013, Regnard et al.—Priority Application in French language.
Certified English Translation of French Application Serial No. 135715, filed Jul. 19, 2013, Regnard et al.
Claas Fritzen, French Search Report for French Patent Application No. 1361603 mailed Jul. 16, 2014, 2 pages, French Patent Office.
Claas Fritzen, French Written Opinion for French Patent Application No. 1361603 mailed Aug. 21, 2014, 5 pages, French Patent Office.
French Patent Application Serial No. 1361603, Cover Letter (1 page) and attachment of Third Party Observations (10 pages) mailed Aug. 14, 2015 to Applicant Airbus by French Patent Office INPI.
Poll, Andreas, International Search Report for WO/2015/007919, Oct. 20, 2014, 6 pages, ISA European Patent Office.

* cited by examiner

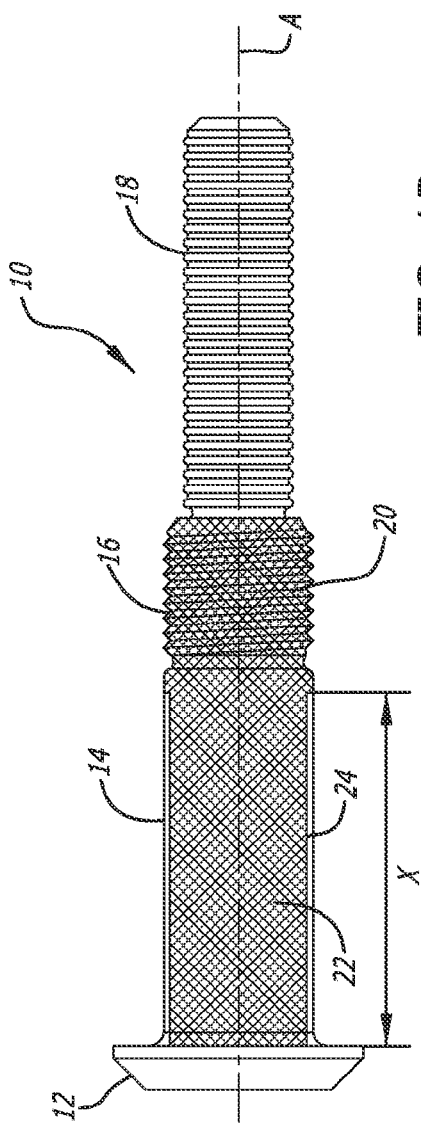
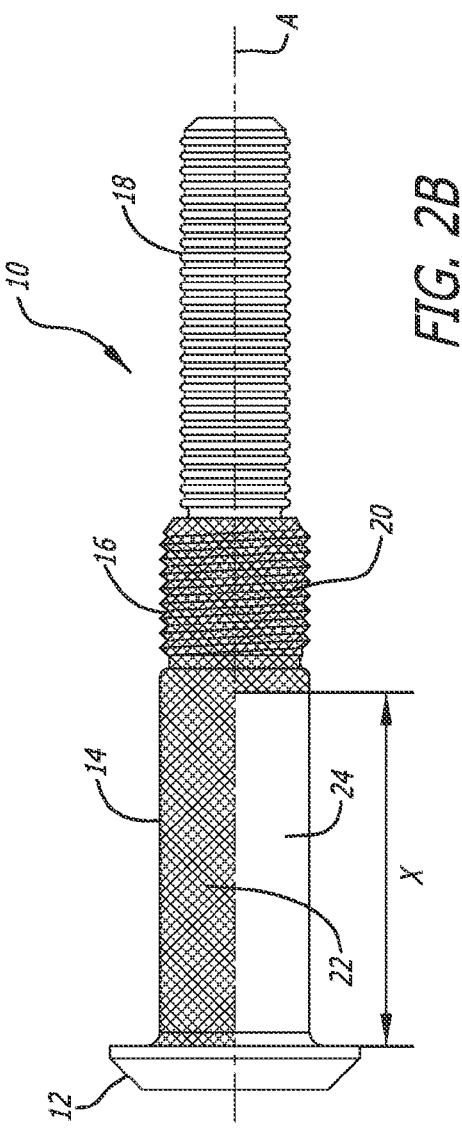
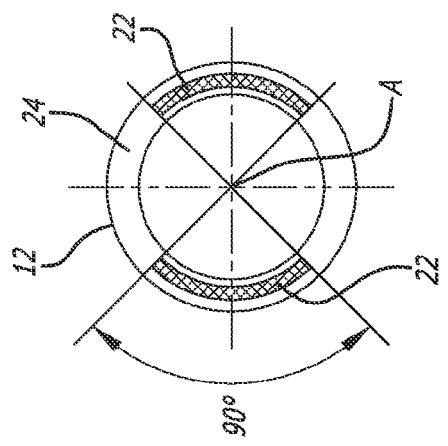
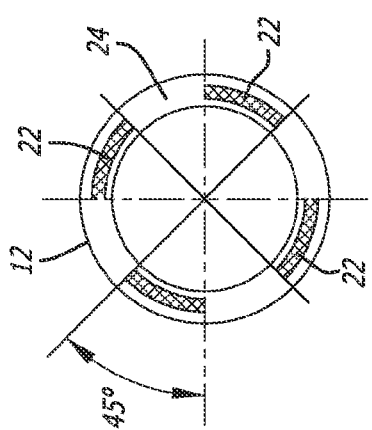

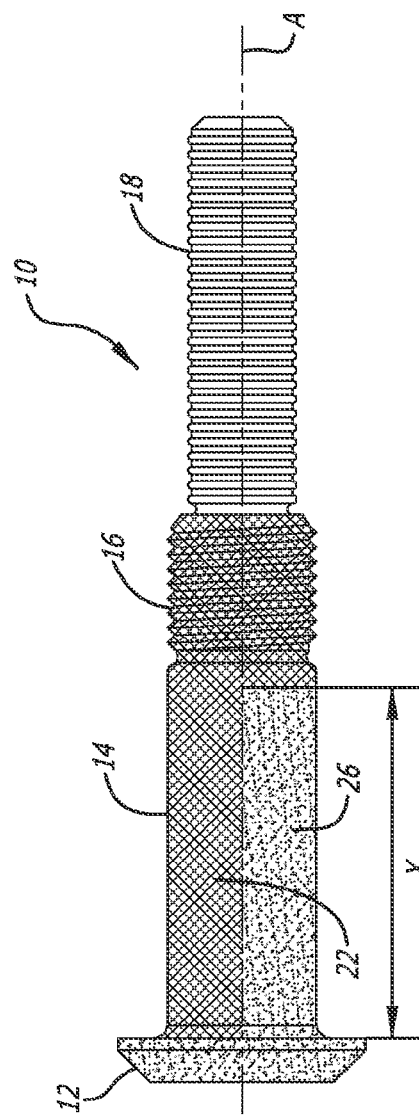
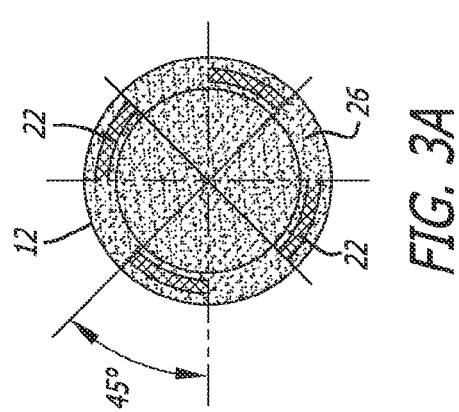
FIG. 3A
FIG. 3B
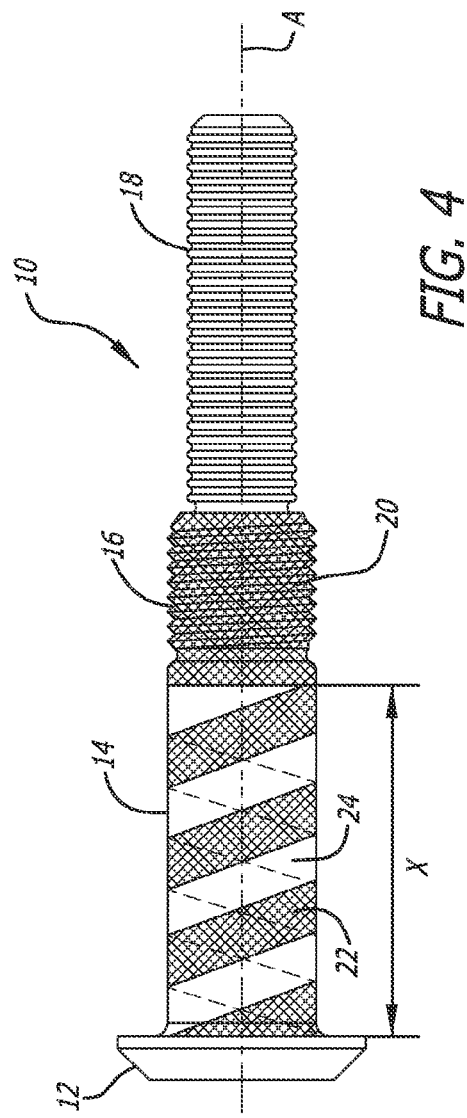
FIG. 4

METAL FASTENER

CROSS-REFERENCE TO RELATED APPLICATIONS

The present application is a continuation of International Application No. PCT/FR2013/052427, filed Oct. 10, 2013, published as WO2015/007957, and which claims priority to FR1357157 filed Jul. 19, 2013. The entire contents of the aforementioned applications and publications are incorporated herein by reference.

BACKGROUND OF THE INVENTIONS

1. Field of the Inventions

The present invention relates to a metal fastener with a partial lubricating coating. The technical field of the invention is generally that of fasteners. More specifically, the invention relates to screws, lock groove fasteners, and any other metal fastener intended to assemble structural elements, such as pre-bored elements of an aircraft. Such fasteners are generally made from a metal material like stainless steel or a titanium alloy.

2. Related Art

The new generation of airplanes uses a composite material structure with the benefit of significantly lessening the mass of the airplane and not being sensitive to the phenomenon of fatigue. However, unlike a metal structure, composite materials have the drawback of poorly conducting electricity, and pose problems of lighting strike resistance. In order to resist lightning, it is necessary to close up all spaces that may exist between the fastener and the bore in order to prevent the electrical breakdown of the air.

In the prior art, document WO 2011/050040 teaches sleeve fasteners installed with an interference fit in composite materials. An interference fit is defined by installing a fastener whose outer diameter is greater than the bore diameter that will receive it, which causes the bore to expand when installing the fastener. The fastener comprises a rod comprising a lubricating coating on the threaded portion and on the transitional portion between the straight shank and the threaded part, to facilitate the insertion of the rod into the sleeve. The drawback of this fastening system is that it includes very little lubricating coating on the shank, which may require very great force to install the fastener.

In addition, the thicker the structures to assemble are, the greater the force required to insert an interference fastener. They may exceed the maximum force for installing the fastener above which the fastener breaks, whether in the threads, or in a traction groove, or in the installation tool.

It is also known that document GB 2 212 580 teaches an unsleeved metal fastener installed in a composite material structure. This fastener comprises a dielectric lubricating coating—of the TEFLON™ or $MoS_2$ type—on a portion of its shank, allowing the fastener to be inserted into the bore. The portion of the shank connected to the head, supported by an outer surface of the aircraft's structure, which may be struck by lightning, is left bare in order to allow electrical currents to pass from the fastener's head into the structure of the aircraft via the bare metal shank portion, which is conductive. The drawback of this fastener is that it has a single conductive portion placed arbitrarily close to the head, which requires that the adjacent structure be relatively conductive, or comprise a conductive metal mesh.

SUMMARY OF THE INVENTIONS

One objective of the present application is to address the problems of fasteners of the aforementioned prior art. One objective of the invention is to obtain a fastener able to conduct electricity into all layers of a structure comprising at least one low-conductivity layer when the element is struck by lightning, without requiring too much installation force.

The subject matter of the invention is therefore a metal fastener comprising an enlarged head and a smooth shank extending along an axis of revolution, the shank comprising at least one conductive portion and one lubricating portion disposed continuously along the axis of revolution of the fastener.

The inventive fastener makes it possible to ensure an electrical contact surface on all the structural elements to be assembled—whether they are good or poor conductors—regardless of the composition of the structure, based on the dimensions of the conductive strips. The fastener may therefore be installed in any structure, without requiring a conductive coating in a specific location.

The fastener according to the invention may be installed in structures fully composed of composite materials, or in mixed structures, meaning those that use both composite and metallic materials like aluminum alloys or titanium alloys, for example. In both of these cases, the insertion of the fastener according to the invention may be an interference fit in a metal sleeve previously disposed in a bore of the structures, in order to avoid all risk of delaminating the composite when installing the fastener, and to fill in all air pockets that may exist between the structure and the fastener.

The inventive fastener may also be installed in solely metallic structures, such as those made of aluminum or titanium.

The inventive fastener may comprise one or more of the following characteristics:
- the conductive and lubricating portions are disposed parallel to the fastener's axis of revolution,
- at least two lubricating strips are disposed in diametrically opposite fashion relative to the fastener's axis of revolution,
- the conductive and lubricating portions are disposed helically around the fastener's axis of revolution,
- the conductive portion is a bare metal portion, or a bare metal portion covered with an electrically conductive layer,
- the lubricating portion is a solid lubricating film or an organic resin coating comprising aluminum pigments,
- the shank of the fastener is cylindrical or conical,
- the fastener further comprises a metal sleeve of which an inner diameter is less than an outer diameter of the fastener's shank,
- the locking portion is a thread or a plurality of lock grooves.

BRIEF DESCRIPTION OF THE DRAWINGS

The invention and its various applications shall be better understood upon reading the following description and reviewing the figures that accompany it. Those figures are presented only as an example, and in no way limit the invention. The figures depict:

FIG. 1A: A schematic depiction of an end view of a first example fastener according to the invention;

FIG. 1B: A schematic depiction of a side view of a first example fastener according to the invention;

FIG. 2A: A schematic depiction of an end view of a second example fastener according to the invention;

FIG. 2B: A schematic depiction of a side view of a second example fastener according to the invention;

FIG. 3A: A schematic depiction of an end view of a third example fastener according to the invention;

FIG. 3B: A schematic depiction of a side view of a third example fastener according to the invention;

FIG. 4: A schematic depiction of a side view of a fourth example fastener according to the invention.

DETAILED DESCRIPTION

FIGS. 1A and 1B schematically depict a first example fastener according to the invention. FIG. 1B depicting metal fastener 10, such as one made of the titanium alloy TiA6V, comprising a protruding enlarged head 12, a cylindrical smooth shank 14, and a locking portion 16 in the form of a thread onto which a nut (not depicted) may be tightened. The fastener additionally comprises a pulling stem 18 that makes it possible to pull on the rod in order to insert it into a pre-bored structure. That stem 18 may be an integral part of the rod 10, or removable by means of a threaded end inserted into a tapped end created inside the threaded portion 16. This pulling stem is optional, and may be omitted.

The smooth shank 14, intended to come in contact with a structure made of one or more materials, which are metal or made of composite materials, is bare. Preferably, it is oxidized by sulfuric acid anodizing to improve the resistance to galvanic corrosion. The threaded portion 16 is fully coated with a layer of lubricant 20, to prevent galling of the nut while it is being installed. The smooth shank further comprises two portions 22 of lubricating coating, disposed in the form of strips having respective side portions where the strips are parallel to the axis of revolution A of the fastener. Each lubricating portion 22 extends onto the smooth shank 14 and a portion under the head 12. The two lubricating strips 22 are disposed in diametrically opposite fashion relative to the axis of revolution A, with a 90° angle between the facing side portions of each strip as depicted in FIG. 1A. The shank 14 surfaces 24 left between the lubricating strips 22 are conductive, and extend along a length X of the shank 14. In this example, the shank 14 has 50% lubricated contact surface area and 50% electrically conductive surface area. The conductive portions 24 being disposed parallel to the axis of revolution A, conduction is ensured regardless of the composition of the structure into which the fastener is inserted. The lubricating portions 22 make it possible to ensure minimal lubrication of the smooth shank 14 along its entire height, so that the fastener may be installed without requiring too much force and without risk of breaking the fastener.

The lubricant used to cover the thread 16 and the lubricating portions 22 may be a solid lubricating film, of the $MoS_2$ type, or more generally, compliant with the SAE AS5272 standard. The lubricant may also be an organic resin with aluminum pigments, such as the coating HI-KOTE™ 1 or HI-KOTE™ 1NC sold by Hi-Shear Corp. of Torrance, Calif. This type of coating is, for example, described in U.S. Pat. No. 3,983,304 and EP2 406 336. The lubricant may also be of the type described in the NAS4006 standard. The lubricant is deposited along a thickness of 5 to 13 µm, for example by spraying. The rod may be covered with a second lubricating layer, such as cetyl alcohol. This second coat facilitates the insertion of the fastener into the structure, and gradually comes off the installation because it does not adhere very strongly to the surface.

FIGS. 2a and 2b depict the same fastener 10 as the one described with reference to FIGS. 1A and 1B. The only difference resides in the number of lubricating portions 22 applied onto the smooth shank 14. In those figures, the shank 14 is covered with four lubricating portions 22, disposed in diametrically opposed fashion relative to the axis of revolution A, with a 45° angle between each strip as depicted in FIG. 2A. In this example, the total conductive surface area of the conductive strips 24 represents 50% of the contact surface area between the fastener's shank and the structure.

FIGS. 3a and 3b depict the same fastener 10 as the one described with reference to FIGS. 1A and 1B. The difference comes from the fact that the fastener is entirely covered with a first conductive layer 26, and comprises two lubricating portions 22 applied to the first metal layer 26. The conductive layer 26 makes it possible to improve electrical conduction between the fastener 10 and the structure. It may be created in the form of a metal deposit of aluminum, or a conductive organic coating.

FIG. 4 depicts a fourth example embodiment of the invention. The fastener is identical to the one described with reference to FIGS. 1A and 1B. The difference comes from the fact that the lubricating portion 22 is created in the form of a helix winding around the axis of revolution A of the fastener 10. The conductive portion 24 is also helical.

Naturally, the invention is not limited to the examples given above, and the fastener may vary in its shapes and/or the materials used. Thus, the number of lubricating portions 22 may vary, and the proportion of surface area covered may also vary depending on the fastener's expected performance. A conductive surface area proportion of 50% of the contact surface area between the fastener's shank and the structure is preferable, but this proportion may vary between 20% and 80% of the contact surface area between the fastener's shank and the structure. The length X may vary, and may cover only part of the smooth shank 14, as the width of the conductive 24 and lubricating 22 portions must be adapted based on the desired proportion of total conductive surface area. The portion under the head might also not be covered with lubricant.

In one variant, the locking portion 16 may be formed of lock grooves, onto which a metal collar is swaged. In such a case, it is not necessary to lubricate that portion.

The smooth shank 14 may be conical, and installed either in a conical drilled hole, or any sleeve whose inner surface is conical and whose outer surface is cylindrical, in order for the assembly to be installed in a cylindrical drilled hole, which is easier to create than a conical drilled hole. When the inventive device is used with a sleeve, the sleeve comprises an inner diameter less than an outer diameter of the fastener's shank so that the fastener, once inserted, radially expands the sleeve against the sides of the hole drilled into the structure. This variant is particularly well-suited to structures that comprise at least one layer of composite material.

The fastener's head 12 may be countersunk and fit into an additional countersink created in the structure.

The invention claimed is:

1. A metal fastener comprising an expanded head and a smooth shank extending in an axis of revolution, characterized in that the shank comprises at least one portion treated by anode oxidation and at least one lubricating portion, wherein the at least one portion treated by anode oxidation and at least one lubricating portion are disposed continuously along the axis of revolution (A) of the fastener and wherein the at least one lubricating portion has a side portion disposed continuously along the axis of revolution and anode oxidation extends in a circumferential direction away from the side portion.

2. A metal fastener according to claim 1, wherein the at least one portion treated by anode oxidation and the lubricating portion are disposed parallel to the axis of revolution (A) of the fastener.

3. A metal fastener according to claim 2, wherein at least two lubricating portions are disposed in diametrically opposite fashion relative to the axis of revolution (A) of the fastener.

4. A metal fastener according to claim 1, wherein the lubricating portion is a solid lubricating film or an organic resin coating comprising aluminum pigments.

5. A metal fastener according to claim 1, where in the shank is cylindrical.

6. A metal fastener according to claim 1, further including a locking portion comprising a thread.

7. The metal fastener of claim 1 wherein the at least one lubricating portion extends a distance X along the axis of revolution (A) less than a length of the shank.

8. A fixing element for securing components of an assembly, comprising:
   a metal rod comprising a cylindrical shaft and an end, the metal rod comprising:
   a first region that is at least partially surface-treated by means of anode oxidation; and
   a second region coated over at least a portion with a lubricating coating disposed continuously along the axis of revolution (A) of the fastener and wherein the lubricating coating has a side portion disposed continuously along the axis of revolution and anode oxidation extends in a circumferential direction away from the side portion.

9. The fixing element of claim 8, wherein the cylindrical shaft comprises:
   at least a first strip that extends in the length of the cylindrical shaft and which is surface-treated by means of anode oxidation; and
   at least a second strip that extends in the length of the cylindrical shaft and which is coated with the lubricating coating.

10. The fixing element of claim 9, wherein the cylindrical shaft comprises:
    a plurality of first strips that are surface-treated by means of anode oxidation; and
    a plurality of second strips that are coated with a lubricating coating, the first and second strips extending over angular sectors that are distributed around the periphery of the cylindrical shaft.

11. The fixing element of claim 10, wherein the first and second strips are distributed in a substantially uniform manner around the periphery of the cylindrical shaft.

12. The fixing element of claim 10 wherein the cylindrical shaft comprises first strips that are surface-treated by means of anode oxidation and each over three angular sectors of a first angle, respectively, and that are separated in pairs by means of a second strip that is covered with the lubricating coating and extends over an angular sector of a second angle.

13. The fixing element of claim 10, wherein the cylindrical shaft comprises two first strips that are surface-treated by means of anode oxidation and that extend over two angular sectors between substantially 90 and 150°, respectively, and two second strips which are covered with a lubricating coating that extends over two angular sectors between substantially 30 and 90°, respectively.

14. The fixing element of claim 10, wherein the rod is at least partially surface-treated by means of sulphuric anode oxidation.

15. The fixing element of claim 14, wherein lubricating coating (R) is a coating comprising phenolic resin.

16. An aircraft assembly, comprising:
    a first component;
    a second component; and
    a metal rod comprising a cylindrical shaft and an end for securing the first and second components, the metal rod comprising:
    a first region that is at least partially surface-treated by means of anode oxidation; and
    a second region coated over at least a portion thereof with a lubricating coating disposed continuously along the axis of revolution (A) of the fastener and wherein the lubricating coating has a side portion disposed continuously along the axis of revolution and anode oxidation extends in a circumferential direction away from the side portion.

17. Aircraft comprising at least one assembly according to claim 16.

18. The aircraft assembly of claim 16, wherein the cylindrical shaft comprises:
    at least a first strip that extends in the length of the cylindrical shaft and which is surface-treated by means of anode oxidation; and
    at least a second strip that extends in the length of the cylindrical shaft and which is coated with the lubricating coating.

19. The aircraft assembly of claim 18 wherein the cylindrical shaft comprises;
    a plurality of first strips that are surface-treated by means of anode oxidation; and
    a plurality of second strips that are coated with a lubricating coating, the first and second strips extending over angular sectors that are distributed around the periphery of the cylindrical shaft.

20. The aircraft assembly of claim 19, wherein the oxidation is a sulfur anode oxidation.

21. The aircraft assembly of claim 20, wherein the metal rod comprises a cylindrical shaft and an end, and wherein a section between the cylindrical shaft and the end is frustro-conical.

22. The aircraft assembly of claim 20 wherein the anode oxidation has a thickness that allows conductivity.

23. The aircraft assembly of claim 20 wherein the lubricant coating is substantially 5 microns thick.

24. The aircraft assembly of claim 20 wherein the metal rod is titanium.

* * * * *